(12) United States Patent
Park (10) Patent No.: US 9,647,488 B2
(45) Date of Patent: May 9, 2017

(54) POWER SUPPLY APPARATUS HAVING A POWER CONVERTER AND SOLAR CELL MODULE, POWER SUPPLY SYSTEM AND METHOD OF SUPPLYING POWER THEREOF

(75) Inventor: Jeong-gyu Park, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 766 days.

(21) Appl. No.: 13/228,862

(22) Filed: Sep. 9, 2011

(65) Prior Publication Data

US 2012/0081088 A1    Apr. 5, 2012

(30) Foreign Application Priority Data

Oct. 1, 2010    (KR) .......................... 10-2010-95781

(51) Int. Cl.
*G05F 1/00* (2006.01)
*H02J 7/35* (2006.01)
(Continued)

(52) U.S. Cl.
CPC ................ *H02J 7/35* (2013.01); *H02J 7/345* (2013.01); *G05F 1/67* (2013.01); *Y02E 10/56* (2013.01)

(58) Field of Classification Search
CPC ........ H02M 3/156; H02M 3/10; H02M 3/157; H02M 3/1588; H02J 7/35; H02J 3/383; H02J 7/345; G05F 1/67; Y02E 10/58
(Continued)

(56) References Cited

U.S. PATENT DOCUMENTS 5,892,354 A    4/1999  Nagao et al.
6,586,887 B1 *  7/2003  Oogoshi et al. .. H01J 37/32082
                                                   219/121.57
(Continued)

FOREIGN PATENT DOCUMENTS

EP    2 048 550 A1    4/2009
JP    2003-528559      9/2003
(Continued)

OTHER PUBLICATIONS

Extended European Search Report dated Aug. 4, 2016 in corresponding European Patent Application No. 11172602.2.
(Continued)

*Primary Examiner* — Gustavo Rosario Benitez
(74) *Attorney, Agent, or Firm* — Staas & Halsey LLP (57) ABSTRACT

A method of supplying power from a solar cell module to a load includes measuring the output of the solar cell module, and controlling a power converter having a preset duty ratio to start operating in accordance with the measured output. Additionally, a power supply apparatus and a power supply system include a solar cell module having at least one solar cell to absorb sunlight, a power converter which converts power output from the solar cell module and supplies the converted power to a load, and a driving controller which measures the output of the solar cell module and controls the power converter having a preset duty ratio to start operating according to the measured output. Thus, electrical stress on the power converter is significantly decreased even though incident solar energy and/or the load is largely varied, so that the power converter may be stably driven to output the power.

23 Claims, 9 Drawing Sheets

(51) Int. Cl.
*H02J 7/34* (2006.01)
*G05F 1/67* (2006.01)

(58) Field of Classification Search
USPC .............. 323/282, 906, 285, 284, 299, 351
See application file for complete search history.

(56) References Cited

U.S. PATENT DOCUMENTS

| | | | | |
|---|---|---|---|---|
| 6,919,714 | B2* | 7/2005 | Delepaut | 323/284 |
| 8,629,658 | B1* | 1/2014 | Celani | 320/140 |
| 2004/0056642 | A1* | 3/2004 | Nebrigic et al. | 323/284 |
| 2007/0103132 | A1* | 5/2007 | Hendrix et al. | 323/282 |
| 2008/0149167 | A1* | 6/2008 | Liu | 136/248 |
| 2012/0014148 | A1* | 1/2012 | Li et al. | H02M 1/4216 363/78 |

FOREIGN PATENT DOCUMENTS

| | | |
|---|---|---|
| JP | 2006-39634 | 2/2006 |
| JP | 2008-166690 | 7/2008 |
| JP | 2010-34108 | 2/2010 |
| KR | 10-2009-0084541 | 8/2009 |
| WO | WO 01/71894 A2 | 9/2001 |

OTHER PUBLICATIONS

Korean Office Action dated May 18, 2016 in corresponding Korean Patent Application No. 10-2010-0095781.
Korean Office Action dated Nov. 21, 2016 in corresponding Korean Patent Application No. 10-2010-95781 (4 pages) (4 pages English Translation).
Korean Notice of Allowance dated Jan. 16, 2017 in corresponding Korean Patent Application No. 10-2010-95781 (1 page) (1 page English Translation).

* cited by examiner

POWER SUPPLY APPARATUS HAVING A POWER CONVERTER AND SOLAR CELL MODULE, POWER SUPPLY SYSTEM AND METHOD OF SUPPLYING POWER THEREOF

CROSS-REFERENCE TO RELATED APPLICATIONS

This application claims priority under 35 U.S.C. §119(a) from Korean Patent Application No. 10-2010-0095781, filed on Oct. 1, 2010 in the Korean Intellectual Property Office, the disclosure of which is incorporated herein by reference.

BACKGROUND

1. Field of the Invention

Apparatuses and methods consistent with the exemplary embodiments relate to a power supply apparatus, a power supply system and a method of supplying power thereof, and more particularly, to a power supply apparatus, a power supply system and a method of supplying power thereof, in which sunlight is absorbed and converted into electric power, thereby supplying power.

2. Description of the Related Art

A conventional converter that converts electric power output from a solar cell of absorbing sunlight employs a control method for reducing a charging current in accordance with input power from the solar cell through maximum power point tracking (MPPT), so that power conversion can be performed by keeping the maximum available value, i.e., the maximum voltage of the output power from the solar cell. In a conventional MPPT, a maximum output occurs when a source resistance of the solar cell equals a load resistance of a load realized by the solar cell.

Figure 1:
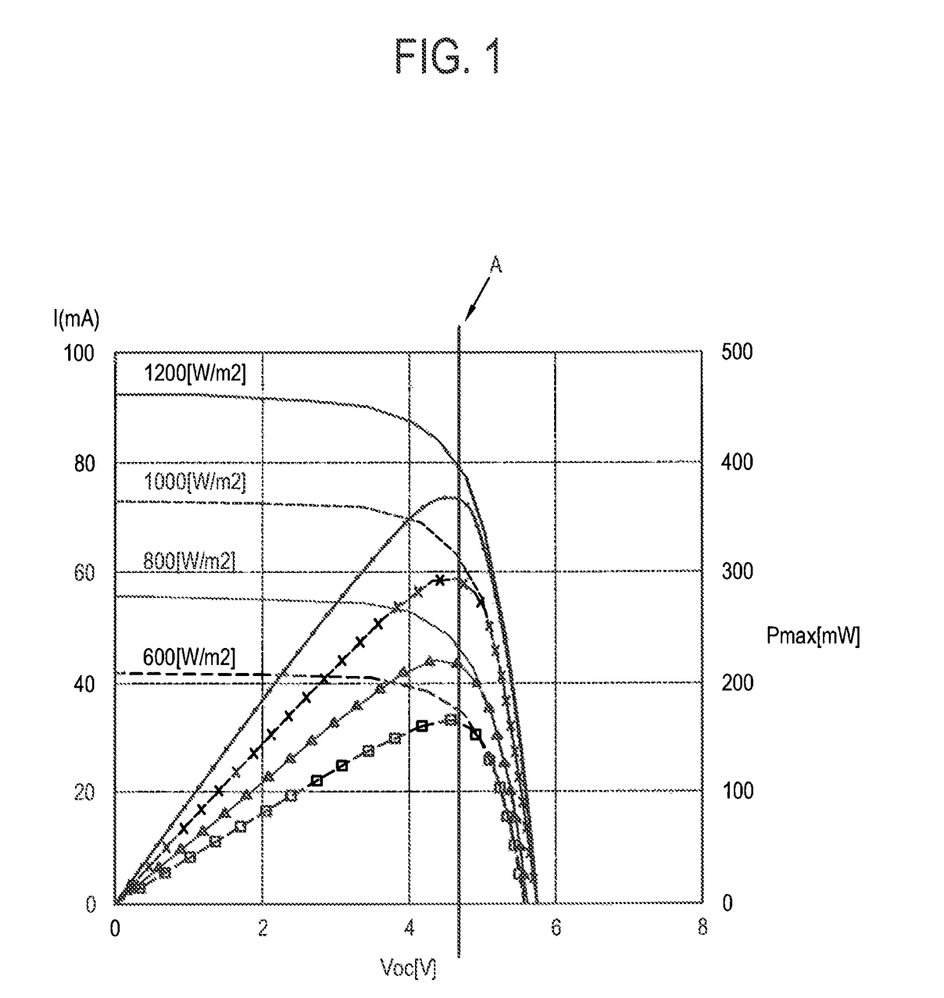
FIG. 1 illustrates a view of a conventional (maximum power point tracking (MPPT) control method.

FIG. 1 is a graph showing power conversion based on the MPPT control, in which a dotted line indicates an electric current output from the solar cell and a solid line indicates an output voltage of the solar cell. Since power is the product of voltage and current, it is possible to find out the maximum power in an "A" line. Thus, it will be appreciated that current is decreased at a constant voltage Voc (open circuit voltage) when tracking a point of current decreased in accordance with incident energy of the solar cell. The MPPT control is a method of controlling the power to be always output at a maximum power point by measuring current and voltage at an output terminal of the solar cell, receiving the values of the measured current and voltage through an analog-digital converter (ADC), decreasing a duty ratio of the converter if the measured current and voltage are lower than the maximum power point, and increasing the duty ratio of the converter if the measured current and voltage are higher than the maximum power point.

However, if the incident energy to the solar cell is rapidly varied with rapid variation of sunshine, the conventional converter employing the MPPT control has to rapidly decrease/increase the duty ratio in order to output power at the maximum power point in accordance with the rapid variation of the incident energy. At this time, the converter is under undue electrical stress, and noise occurs due to voltage variation at an input terminal of the converter.

To reduce the electrical stress on the converter due to rapid variation in the incident solar energy, an energy storage tank such as a lithium ion battery may be provided at the input terminal of the converter. However, if the incident solar energy exceeds the capacity of the energy storage tank, the same problem may arise as described above. Further, there is a shortcoming in that the energy storage tank is expensive.

Also, there is a problem in that the conventional converter based on the MPPT control does not take into account any load variation.

SUMMARY

Accordingly, one or more exemplary embodiments provide a power supply, a power supply system and a method of supplying power thereof, in which a converter to convert output from a solar cell is predicted and controlled by taking variation in incident solar energy, load, etc. into account, thereby stably driving the converter with the minimum electrical stress.

Additional features and utilities of the present general inventive concept will be set forth in part in the description which follows and, in part, will be obvious from the description, or may be learned by practice of the present general inventive concept.

The foregoing and/or other features may be achieved by providing a power supply apparatus including a solar cell module which includes at least one solar cell to absorb sunlight, a power converter which converts power output from the solar cell module and supplies the converted power to a load, and a driving controller which measures the output of the solar cell module and controls the power converter having a preset duty ratio to start operating in accordance with the measured output.

The driving controller may control the power converter having the preset duty ratio to operate for a predetermined period of time in accordance with the measured output.

The driving controller may include a solar cell module measuring unit to measure the output of the solar cell module.

The driving controller may include a driving time calculator to calculate a driving time of the power converter in accordance with the output measured by the solar cell module measuring unit.

The driving controller may include a capacitor to charge the output of the solar cell module, and the driving time calculator may calculate the driving time of the power converter in accordance with the charged capacity.

The driving controller may include an output measuring unit to measure the output from the power converter to a load.

The driving controller may include a driving time calculator to calculate a driving time of the power converter in accordance with difference between the charged output and the measured output of the power converter.

The driving controller includes a capacitor to charge the output of the solar cell module, and the driving time calculator may calculate the driving time of the power converter in accordance with the charged output and the measured output of the power converter.

The driving controller may include a driving level calculator to calculate a driving level of the power converter in accordance with the measured output of the solar cell module, and the power converter may include a driving comparator to compare whether the power converter is driven in accordance with the calculated driving level.

The driving controller may include an output measuring unit to measure output from the power converter to a load, and the driving level calculator may calculate the driving level of the power converter in accordance with difference between the measured output from the solar cell module and the measured output from the power converter.

The driving controller may include a capacitor to charge the output of the solar cell module, and the driving level calculator may calculate a driving level of the power converter in accordance with difference between the charged output and the measured output of the power converter.

The power converter may include a direct current (DC)-direct current (DC) converter.

The driving controller may include a differential amplifying unit to amplify difference between the measured output of the solar cell module and the measured output of the power converter.

Another feature may be achieved by providing a power supply system including a power supply apparatus which includes a solar cell module including at least one solar cell to absorb sunlight, a power converter converting power output from the solar cell module and supplying the converted power to an electronic apparatus, and a driving controller measuring the output of the solar cell module and controlling the power converter having a preset duty ratio to start operating in accordance with the measured output, and the electronic apparatus which includes a battery unit, and a system unit operating by receiving power having a predetermined level from at least one of the battery unit and the power supply apparatus.

The driving controller may control the power converter having the preset duty ratio to operate for a predetermined period of time in accordance with the measured output.

The system unit may receive the power having a predetermined level from only the battery unit when a predetermined driving time of the power converter is terminated.

The driving controller may include a solar cell module measuring unit to measure the output of the solar cell module; and an output measuring unit to measure the output from the power converter to the electronic apparatus.

The driving controller may include a driving time calculator to calculate a driving time of the power converter in accordance with difference between the measured output of the solar cell module and the measured output of the power converter.

The driving controller may include a capacitor to charge the output of the solar cell module, and the driving time calculator may calculate the driving time of the power converter in accordance with difference between the charged capacity and the measured output of the power converter.

The driving time calculator may receive information about a mode state of the system unit from the electronic apparatus, and calculates the driving time on the basis of preset output-information of the power converter with respect to the received information.

The mode state of the system unit may include an operating mode, a normal mode and a standby mode.

The driving controller may include a driving level calculator to calculate a driving level of the power converter in accordance with difference between the measured output of the solar cell module and the measured output of the power converter, and the power converter may include a driving comparator to compare whether the power converter is driven in accordance with the calculated driving level.

The driving controller may include a capacitor to charge the output of the solar cell module, and the driving level calculator may calculate a driving level of the power converter in accordance with difference between the charged output and the measured output of the power converter.

The driving level calculator may receive information about a mode state of the system unit from the electronic apparatus, and calculate the driving time on the basis of preset output-information of the power converter with respect to the received information.

The mode state of the system unit may include an operating mode, a normal mode and a standby mode.

The power converter may include a direct current (DC)-direct current (DC) converter.

The driving controller may include a differential amplifying unit to amplify difference between the measured output of the solar cell module and the measured output of the power converter.

Still another feature may be achieved by providing a power supplying method of a power supply apparatus, the method including outputting power by absorbing sunlight from a solar cell module; measuring the output of the solar cell module, controlling a power converter having a preset duty ratio to start operating in accordance with the measured output, and supplying the converted power to a load.

The controlling the power converter may include controlling the power converter having the preset duty ratio to operate for a predetermined period of time in accordance with the measured output.

The method may further include calculating a driving time of the power converter in accordance with the measured output.

The method may further include measuring the output from the power converter to the load.

The calculating the driving time may include calculating the driving time of the power converter in accordance with difference between the measured output of the solar cell module and the measured output of the power converter.

Yet another feature may be achieved by providing a power supplying method of a power supply system, the method including, outputting power by absorbing sunlight from a solar cell module; measuring the output of the solar cell module, controlling a power converter having a preset duty ratio to start operating in accordance with the measured output; outputting power converted by the power converter to an electronic apparatus, and supplying a system unit of the electronic apparatus with power having a predetermined level from at least one of the power converter and a battery unit of the electronic apparatus.

The controlling the power converter may include controlling the power converter having the preset duty ratio to operate for a predetermined period of time in accordance with the measured output.

The supplying the system unit with power may include supplying the system unit with the power having a predetermined level from only the battery unit when a predetermined driving time of the power converter is terminated.

The method may further include measuring the output from the power converter to the electronic apparatus.

The method may further include calculating a driving time of the power converter in accordance with difference between the measured output of the solar cell module and the measured output of the power converter.

The calculating the driving time may include receiving information about a mode state of the system unit from the electronic apparatus, and calculating the driving time on the basis of preset output-information of the power converter with respect to the received information.

The mode state of the system unit may include an operating mode, a normal mode and a standby mode.

In another feature of the present general inventive concept, a power supply apparatus includes a power converter to output a converted power based on a solar cell output power, the power supply apparatus comprising a driving controller to determine the converted power output from the power converter and to control the operation of the power converter according to a preset duty ratio based on the determined converted power.

In yet another feature, a power supply apparatus to power a load comprises a power converter including a switching device operable in response to a gate pulse having a duty ratio to convert power from a solar cell into a converted power that is supplied to the load, and a driving controller to generate the gate pulse and to control the power converter by adjusting the duty ratio of the gate pulse based on the converted power output by the power converter.

In still another feature of the present general inventive concept, a power supply apparatus comprising a solar cell module including at least one solar cell to absorb sunlight, a power converter to convert power output from the solar cell module and to supply the converted power to a load, and a driving controller to measure the output of the solar cell module and to operate the power converter according to a preset duty ratio over a predetermined period of time based on the measured output.

BRIEF DESCRIPTION OF THE DRAWINGS

The above and/or other features of the present general inventive concept will become apparent and more readily appreciated from the following description of the exemplary embodiments, taken in conjunction with the accompanying drawings, in which.

DETAILED DESCRIPTION OF THE EMBODIMENTS

Reference will now be made in detail to exemplary embodiments of the present general inventive concept, examples of which are illustrated in the accompanying drawings, wherein like reference numerals refer to the like elements throughout. The exemplary embodiments are described below in order to explain the present general inventive concept by referring to the figures.

Figure 2:
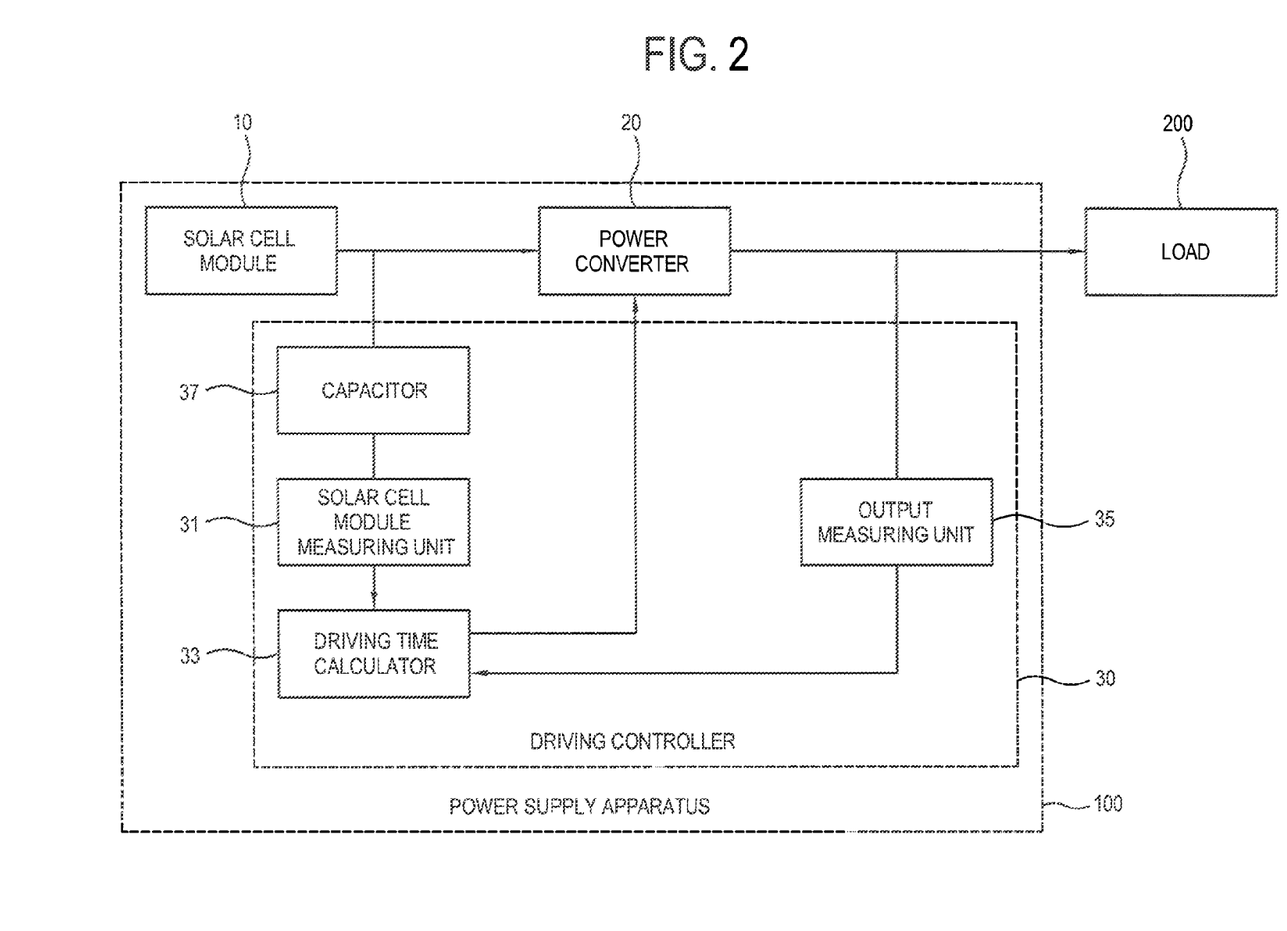
FIG. 2 is a control block diagram of a power supply apparatus according to a first exemplary embodiment.

FIG. 2 is a control block diagram of a power supply apparatus according to a first exemplary embodiment. The power supply apparatus 100 includes a solar cell module 10, a power converter 20 and a driving controller 30.

The solar cell module 10 includes at least one solar cell to absorb sunlight, and outputs a direct current (DC) power from the absorbed sunlight. The solar cell included in the solar cell module 10 may be formed of semiconductor material, including but not limited to, amorphous silicon, monocrystalline silicon, polycrystalline silicon, and a compound semiconductor. Also, a plurality of solar cells may be connected in series and/or in parallel to constitute a solar cell array, thereby acquiring a predetermined voltage and/or current.

The power converter 20 converts output from the solar cell module 10 and supplies the converted power to a load 200.

The power converter 20 may include, but is not limited to, a voltage-fed self-excited inverter, or a DC-DC converter, which uses a self-extinction switching device. The switching device may include, but is not limited to, a gate turn-off thyristor, an insulated gate bipolar transistor, a power transistor, and a power metal oxide semiconductor field effect transistor (MOSFET).

The converted power output (i.e., power, voltage, frequency, etc.) of the power converter 20 may be controlled by adjusting an on/off duty (hereinafter, referred to as a "duty ratio") of a gate pulse supplied to the switching device of the power converter 20 based on the converted power output from the power converter 20, which is described in greater detail below.

The load 200 receives the power output from the power converter 20. The load may include, but is not limited to, a motor, a commercial AC system and combination thereof.

The driving controller 30 measures the output of the solar cell module 10, for example, the DC power output, and controls the power converter 20 having a preset duty ratio to start operating in accordance with the measured output, which is discussed further below. Also, the driving controller 30 measures the output of the solar cell module 10, and controls the power converter 20 having a preset duty ratio to operate for a predetermined period of time corresponding to the measured output, which is also described in greater detail below.

More specifically, the driving controller 30 includes a solar cell module measuring unit 31, a driving time calculator 33, an output measuring unit 35, and a capacitor 37.

The solar cell module measuring unit 31 determines DC power, i.e. voltage and/or current, output from the solar cell module 10. That is, based on the measured output voltage and current from the solar cell module 10, the solar cell module measuring unit 31 may calculate the output power.

The driving controller 30 may preset a predetermined duty ratio to minimize electrical stress on the power converter 20 based on the measured output voltage and current determined by the cell module measuring unit 31. Thus, the driving controller 30 may control the power converter 20 to operating according to a predetermined duty ratio that is based on the measured output of the solar cell module 10.

The driving time calculator 33 is in electrical communication with the solar cell module measuring unit 31 and the power converter 20 to control operation of the power converter 20 based on a calculated driving time. More specifically, the driving time calculator 33 calculates a predetermined period of time during which the power converter 20 operates, i.e., the driving time, on the basis of the output voltage and current measured by the solar cell module measuring unit 31, and outputs a driving control signal to drive the power converter 20, accordingly. Thus, the driving controller 30 may control the power converter 20 to be driven according to the calculated driving time.

The driving controller 30 may previously set up a predetermined duty ratio to minimize electrical stress on the power converter 20 on the basis of the measured output voltage and current. Thus, the driving time calculator 33 may calculate a predetermined period of time, during which the power converter 20 operates, by taking the duty ratio into account in accordance with the output of the solar cell module 10.

The measured output of the power converter 20 is communicated to the driving controller 30 as a feedback control signal. The output measuring unit 35 measures the output, for example a current output and/or a voltage output, from the power converter 20 to the load 200. Accordingly, the output measuring unit 35 outputs the measured output to the driving time calculator 33 as a feedback control signal.

The driving controller 30 may control the power converter 20 having a predetermined duty ratio to start operating based on the feedback control signal. More specifically, the driving controller 30 may operate the power converter 20 according to a predetermined duty ratio based on an output value obtained by subtracting the output of the power converting 20 measured by the output measuring unit 35 from the output measured by the solar cell module measuring unit 31.

Also, the driving controller 30 may control the power converter 20 to have a predetermined duty ratio, and t may drive the power converter 20 for a predetermined period of time in accordance with an output value obtained by subtracting the output of the power converting 20 measured by the output measuring unit 35 from the output measured by the solar cell module measuring unit 31. More specifically, the driving time calculator 33 may calculate a predetermined period of time, during which the power converter 20 operates, in consideration of the communicated output of the power converter 20, along with the measured output of the solar cell module 10. That is, a predetermined period of time over which the power converter 20 having the preset duty ratio is driven may be calculated on the basis of difference between the measured output of the solar cell module 10 and the communicated output of the power converter 20.

Referring again to FIG. 2, the capacitor 37 is coupled between the solar cell module 10 and the solar cell module measuring unit 31, and receives the output from the solar cell module 10. Accordingly, the capacitor 37 is charged in response to the output of the solar cell module 10 to generate a charged voltage of the capacitor 37. Thus, when the solar cell module measuring unit 31 measures the output of the solar cell module 10, a charged voltage of the capacitor 37 may be measured.

The measured value of the voltage charged in the capacitor 37 may be communicated to the driving time calculator 33. Accordingly, the driving time calculator 33 may calculate a period of time, during which the power converter 20 operates, on the basis of the measured value of the voltage charged in the capacitor 37 and/or the output value of the power converter 20 measured by the output measuring unit 35.

Here, the driving time calculator 33 may use the following expression to calculate a predetermined period of time over which the power converter 20 may be driven.

$$V_{conv} - V_{min} = 1/C - I_{solar} - I_{load}d(t),$$ [Expression 1]

where, $V_{conv}$ is a voltage input to the power converter 20, $V_{min}$ is a voltage output from the power converter 20 to the load 200, C is the capacitance of the capacitor 37, $I_{solar}$ is a current output from the solar cell module, and $I_{load}$ is a current output from the power converter 20 to the load 200.

Thus, the driving controller 30 in at least one exemplary embodiment previously calculates and sets up the period of time over which the power converter 20 is to be driven, thereby stably driving the power converter 20. Accordingly, as opposed to the conventional MPPT control method, there is no need for controlling the power converter 20 to track the maximum power point and continuously change the duty ratio, so that the power converter 20 may be driven with the minimum electrical stress.

In at least one exemplary embodiment, the power converter 20 and the driving controller 30 may be achieved by a digital circuit. The output measured by the solar cell module measuring unit 31 and the output measured by the output measuring unit 35 are converted into digital output values and input to the driving controller 30. If the converted digital output value is communicated to the driving time calculator 33 and the driving period of time is calculated, the driving controller 30 sets up the power converter 20 with the calculated driving period of time, thereby controlling the driving period of time of the power converter 20.

Figure 3:
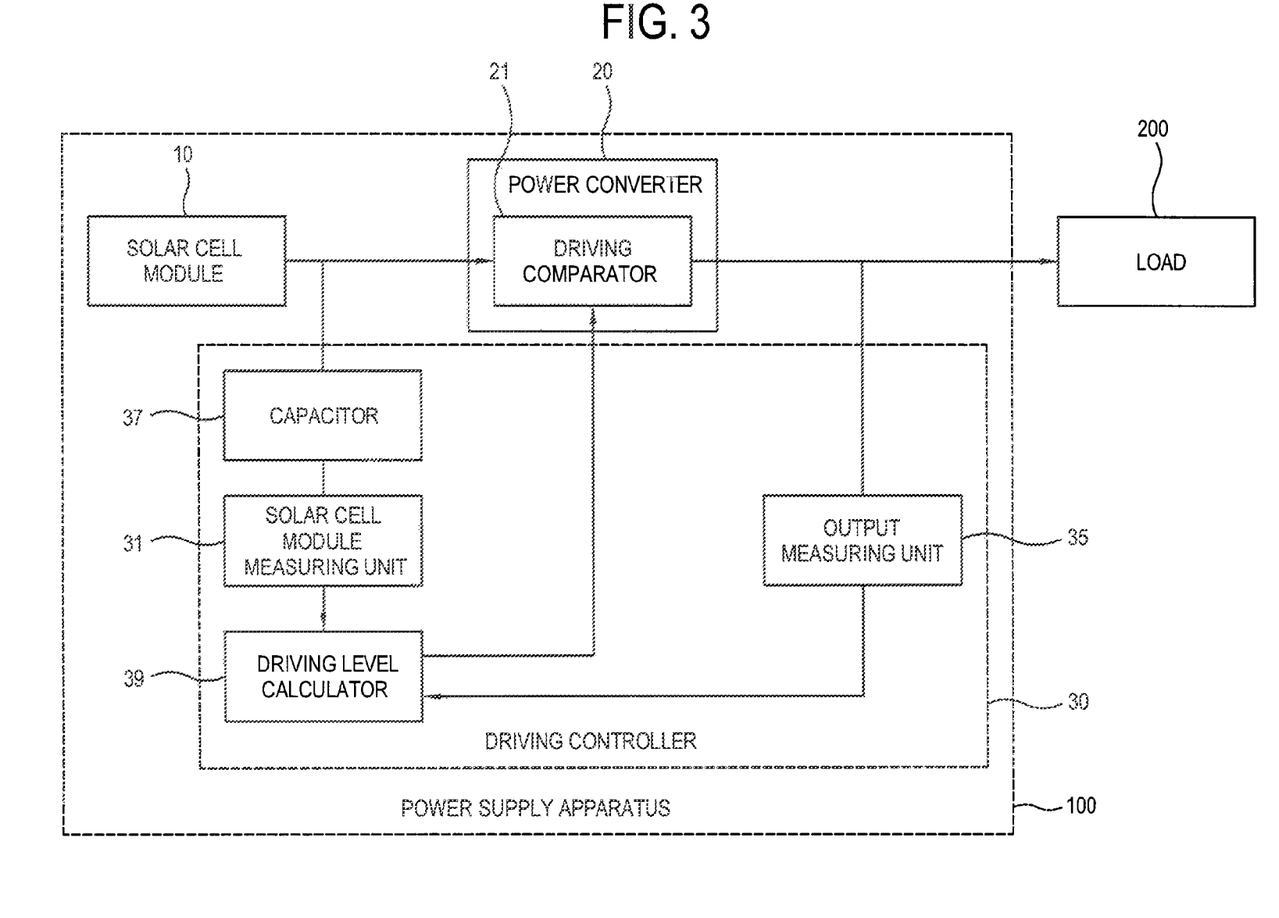
FIG. 3 is a control block diagram of a power supply apparatus according to a second exemplary embodiment.

FIG. 3 is a control block diagram of a power supply apparatus according to a second exemplary embodiment.

As compared with the power supply apparatus of the first exemplary embodiment, the power supply apparatus of the second exemplary embodiment further includes a driving level calculator 39 instead of the driving time calculator 33 of the driving controller 30. Further, the power converter 20 includes a driving comparator 21. In at least one exemplary embodiment, the driving circuit 21 may comprise an analog circuit. Accordingly, except for the driving comparator 21 and the driving level calculator 39, the power supply apparatus of the second exemplary embodiment is similar to the first exemplary embodiment, and thus repetitive descriptions thereof will be avoided as necessary.

Referring to FIG. 3, the driving level calculator 39 determines a driving level of the power converter 20 in accordance with the output of the solar cell module 10 measured by the solar cell module measuring unit 31.

The power to be converted by the power converter 20 is determined by taking the preset duty ratio into account in accordance with the measured output of the solar cell module.

Also, the driving level calculator 39 determines the power to be converted by the power converter 20. More specifically, the driving level calculator 39 takes into account the preset duty ratio by calculating a difference between the measured output of the solar cell module 10 and the output of the power converter 20 measured by the output measuring unit 35. Accordingly, the driving level calculator 39 outputs a driving level signal to the power converter 20 that indicates a driving level of the power converter 20. Thus, the driving controller 30 may control the power converter 20 to operate in accordance with the calculated driving level.

The driving comparator 21 of the power converter 20 illustrated in FIG. 3 determines whether the power converter 20 is driven in accordance with the calculated driving level.

More specifically, according to at least one exemplary embodiment illustrated in FIG. 3, the power converter 20 includes a capacitor (not shown) connected to one end of the driving comparator 21. If the power converter 20 receives a driving level calculated by the driving level calculator 39, the power converter 20 sets up a charging capacity of the capacitor (not shown) in accordance with the driving level. While the power converter 20 converts power output from the solar cell module, the current in the power converter 20 is charged in the capacitor. When the electric charging level of the capacitor reaches a preset capacity, the driving comparator 21 compares the calculated driving level communicated from the driving level calculator 39 with a converted power level of the power converter 20. If the calculated driving level is equal to the converted power level, the power converter 20 stops operating. At this time, the charging completed capacitor realizes an open circuit, and the capacitor (not shown) is discharged. In response to the discharged output of the capacitor, an analog timer (not shown) connected to one end of the capacitor (not shown) is reset. Accordingly, the power converter 20 is controlled to operate during a predetermined period of time.

In the power supply apparatus according to at least one exemplary embodiment, the driving controller 30 may drive the power converter 20 within an acceptable range in accordance with the driving level calculated by the driving level calculator 39.

Figure 4:
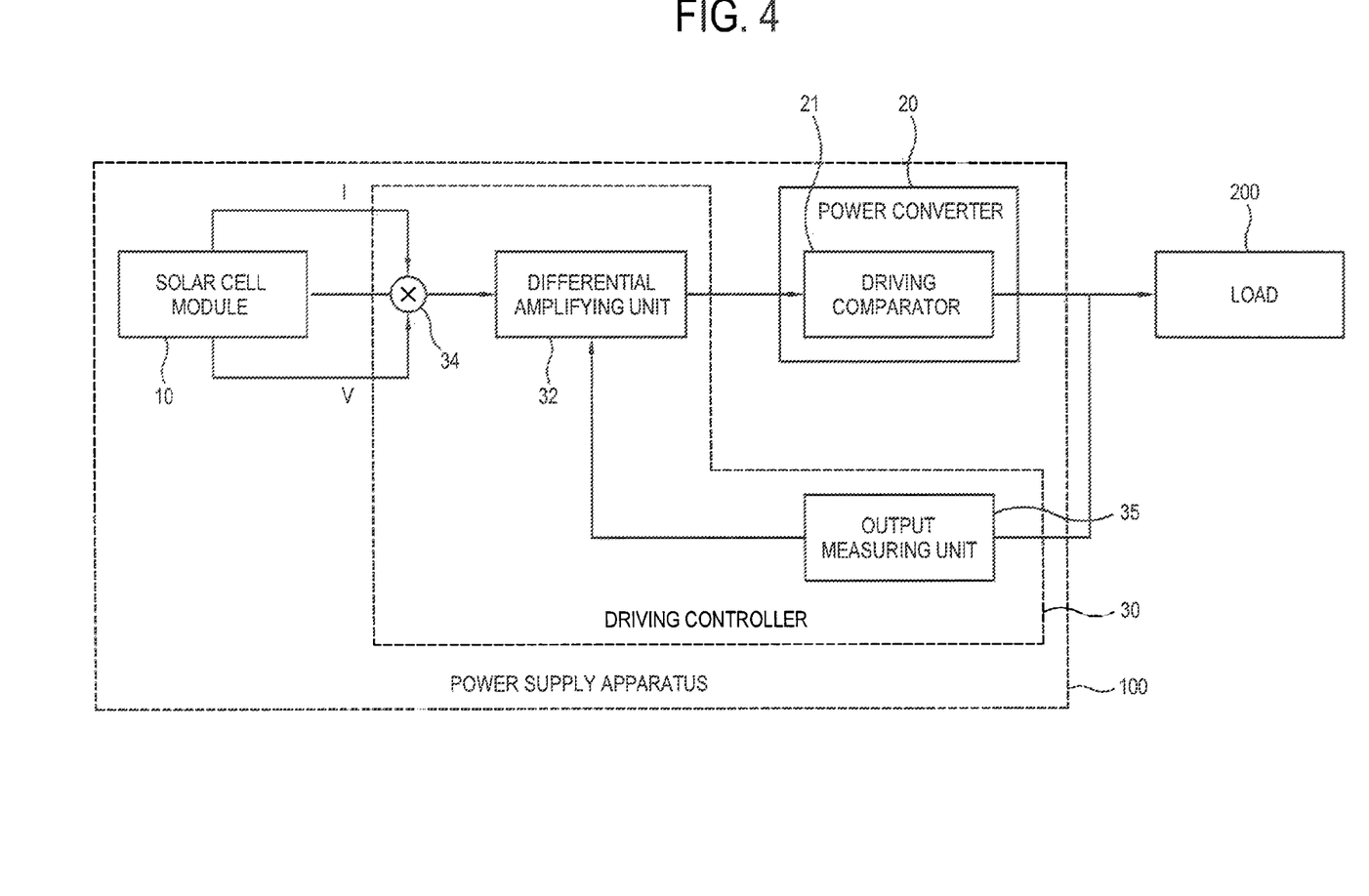
FIG. 4 is a control block diagram of a power supply apparatus according to a third exemplary embodiment.

FIG. 4 is a control block diagram of a power supply apparatus according to a third exemplary embodiment of the present general inventive concept.

As opposed to the power supply apparatus of the second exemplary embodiment illustrated in FIG. 3, the driving controller 30 in the third exemplary embodiment of FIG. 4 is realized as an analog circuit. Besides providing the driving controller 30 as an analog circuit, the power supply apparatus of the third exemplary embodiment illustrated in FIG. 4 is similar the second exemplary embodiment of FIG. 3, and thus repetitive descriptions thereof will be avoided as necessary. Both the driving controller 30 and the power converter 20 in the third exemplary embodiment of FIG. 4 are achieved by analog circuits, so that they are different from the respective digital circuits of the first exemplary embodiment illustrated in FIG. 2.

In this exemplary embodiment, the driving controller 30 measures an output current I and an output voltage V of the solar cell module 10, and communicates the measured outputs to a differential amplifying unit 32 via an analog amplifying unit 34. The output value from the power converter 20 to the load 200, measured by the output measuring unit 35, is communicated to the differential amplifying unit 32. The differential amplifying unit 32 amplifies a difference between the output value received from the analog amplifying unit 34 and the output value of the power converter 20 received from the output measuring unit 35. Accordingly, an amplified result is communicated as a driving level to the driving comparator 21 of the power converter 20. The power converter 20 receiving the driving level operates in a similar manner to the power converter 20 described in the second exemplary embodiment of FIG. 2.

Figure 5:
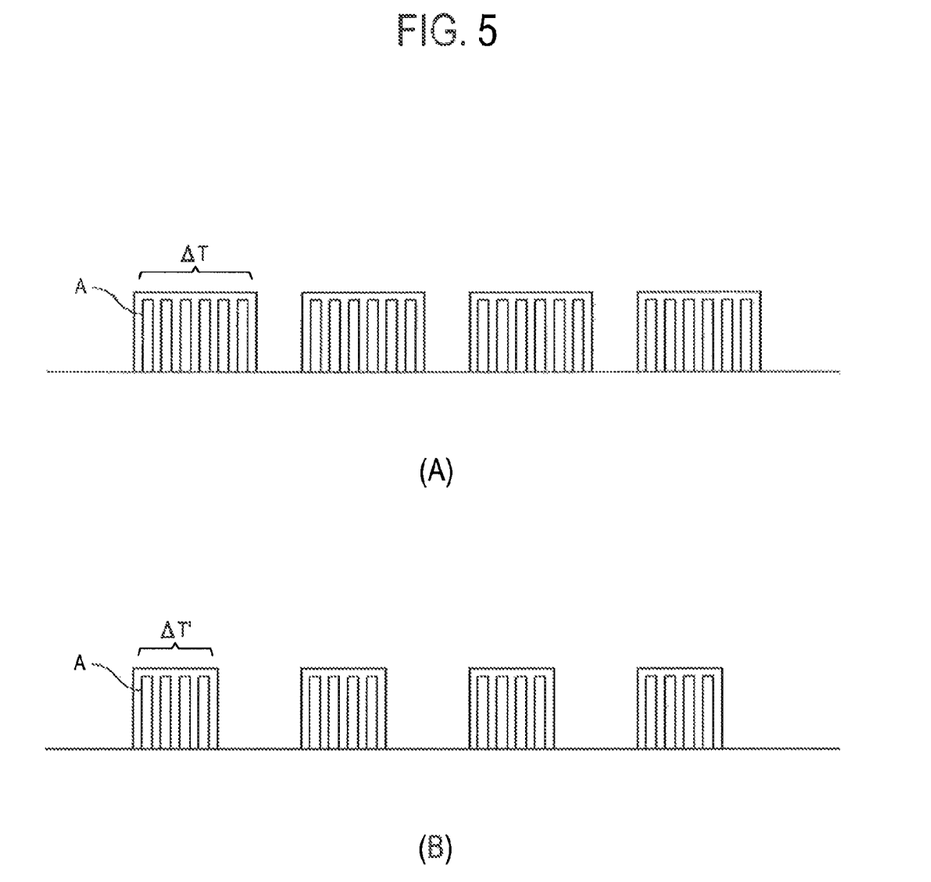
FIG. 5 illustrates an exemplary embodiment that a power converter operates in the power supply apparatus according to the first to third exemplary embodiment.

FIG. 5 illustrates an exemplary embodiment including a power converter that operates in the power supply apparatus according to the exemplary embodiments illustrated in FIGS. 2-4.

In a solar converter employing a conventional MPPT control method, the maximum power point is tracked in accordance with incident solar energy in order to increase/decrease the duty ratio of the solar converter, thereby outputting power at the maximum power point.

With the rapid variation of the incident solar energy, the solar converter must rapidly increase or decrease its duty ratio in accordance with the incident solar energy, and thus the solar converter realizes undue electrical stress.

However, the power converter 20 shown in FIG. 5 reduces the electrical stress on the solar converter, similar to the exemplary embodiments illustrated in FIGS. 2-4.

Referring to FIG. 5, diagrams "A" and "B" show solar cell module outputs measured by the solar cell module measuring unit. That is, diagrams "A" and "B" show the difference between the output of the solar cell module and the output of the power converter 20, determined by the output measuring unit 35.

In FIG. 5, diagram "A" refers to the duty ratio of the power converter 20, and "ΔT" refers to a driving time of the power converter 20.

The driving controller 30 may previously set up the duty ratio of the power converter 20. Thus, the driving time of the power converter 20 is calculated on the basis of the foregoing [Expression 1] by taking the duty ratio into account in accordance with the output of the solar cell module, measured by the solar cell module measuring unit 31; or difference between the output of the solar cell module and the output of the power converter 20, measured by the output measuring unit 35.

Referring further to FIG. 5, the solar cell module output shown in diagram (A) is greater than the solar cell module output shown in diagram (B), measured by the solar cell module measuring unit 31; or difference between the output of the solar cell module and the output of the power converter 20, measured by the output measuring unit 35. As shown in FIG. 5, it is be appreciated that the driving time ΔT of the power converter 20 in diagram (A) is longer than the driving time ΔT' of the power converter 20 in diagram (B).

Therefore, the power converter 20 having the preset duty ratio is not varied during the driving time, so that the power converter 20 is significantly free from the electrical stress of the conventional solar converter, since the power converter 20 is driven by the preset duty ratio even though the incident solar energy and/or the load is largely varied.

Figure 6:
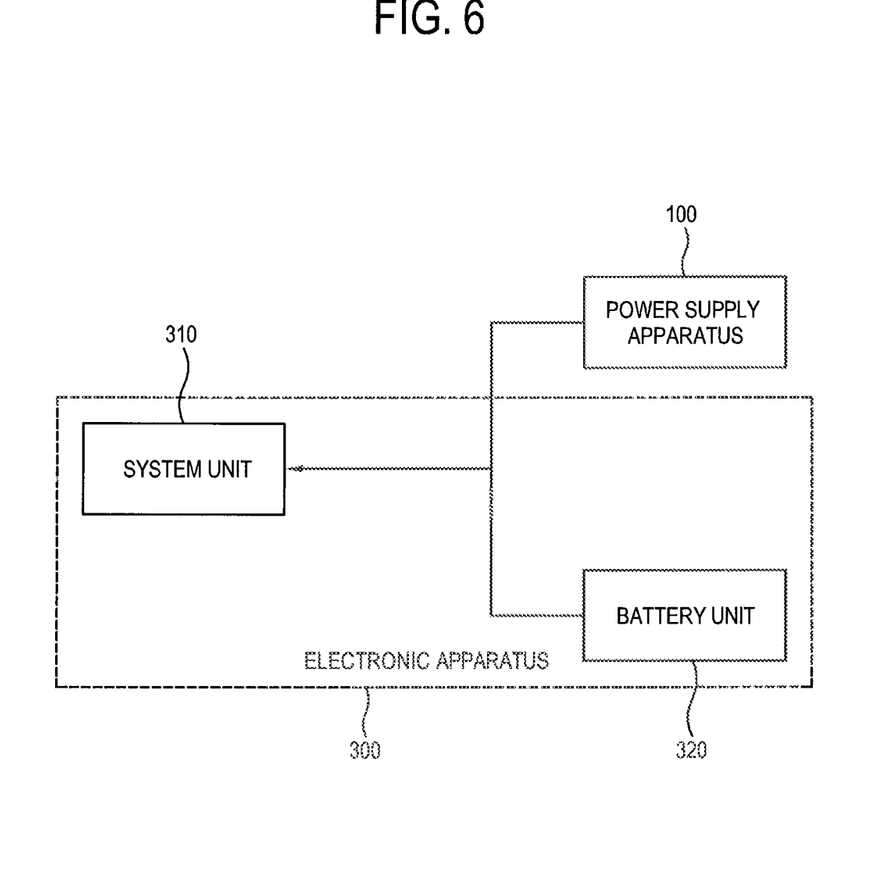
FIG. 6 is a schematic view of a power supply system according to an exemplary embodiment.

FIG. 6 is a schematic view of a power supply system according to an exemplary embodiment.

The power supply system includes the power supply apparatus 100 and an electronic apparatus 300.

The power supply apparatus 100 may include the power supply apparatuses 100 according to the exemplary embodiments illustrated in FIGS. 2-4 discussed in detail above.

The electronic apparatus 300 includes a system unit 310 and a battery unit 320.

The electronic apparatus 300 includes a chargeable battery, which may be any portable mobile electronic apparatus. For example, various mobile electronic apparatuses may include a laptop computer, a personal computer such as a net-book computer, etc.; a mobile phone, a portable media player; etc.

The system unit 310 may perform various functions in accordance with the kind of electronic apparatus 300. The operation of the system unit 310 may include a plurality of system modes, including but not limited to, an operating mode, a normal mode and a standby mode. In the operating mode, all components such as a central processing unit (CPU) or the like included in the system unit 310 operate to thereby allow a user to use the functions of the electronic apparatus 300. In the normal mode, all components such as the CPU or the like of the system unit 310 are provided with power and are on standby to operate. In the standby mode, as a power protection mode of the electronic apparatus, only one or more components, such as the CPU, is supplied with power but the other components of the system unit are not supplied with the power. Regarding the power consumption with respect to each system mode described above, the operation mode consumes the most power, while the standby mode consumes the least power. The system unit 310 may serve as a load of the power supply apparatus 100.

The system unit 310 communicates an operation state of the system unit 310 to the power supply apparatus 100. That is, information about whether the system unit 310 is in the operating mode, the normal mode or the standby mode may be communicated to the power supply apparatus 100.

The battery unit 320 has a predetermined battery capacity to store energy, and is capable of supplying operation power to the system unit 310 if there is no commercial power supplied from the exterior.

Thus, the system unit 310 may receive the operation power from at least one of the battery unit 320 and the power supply apparatus 100.

The power supply apparatus 100 supplies the power output from the power converter 20 to the system unit 310.

Accordingly, the output measuring unit 35 included in the driving controller 30 of the power supply apparatus 100 measures the output from the power converter 20 to the system unit 310, and communicates the measured output to the driving time calculator 33 or the driving level calculator 39.

Also, the solar cell module measuring unit 31 measures the output of the solar cell module, and communicates the measured output to the driving time calculator 33 or the driving level calculator 39.

The driving time calculator 33 calculates the driving time of the power converter 20 by taking the preset duty ratio in accordance with the difference between the measured output of the solar cell module and the measured output of the power converter 20. Accordingly, the driving controller 30 drives the power converter 20 in accordance with the calculated driving time.

The driving level calculator 39 calculates the power to be converted by the power converter 20 by taking the preset duty ratio in accordance with the difference between the measured output of the solar cell module and the measured output of the power converter 20. Accordingly, the driving level calculator 39 outputs a driving level signal to the power converter 20 that indicates a driving level of the power converter 20. Thus, the driving controller 30 may control the power converter 20 to operate in accordance with the calculated driving level.

As described above, the driving time calculator 33 or the driving level calculator 39 may calculate the driving time or the driving level based on the measured value from the solar cell module measuring unit 31 and the output measuring unit 35 in real time.

Alternatively, if the system unit 310 communicates information about a system mode of the power supply apparatus 100, the driving controller 30 may more quickly calculate the driving time and/or the driving level on the basis of the output information of the power converter previously set corresponding to the information about the state of the system mode.

Figure 7:
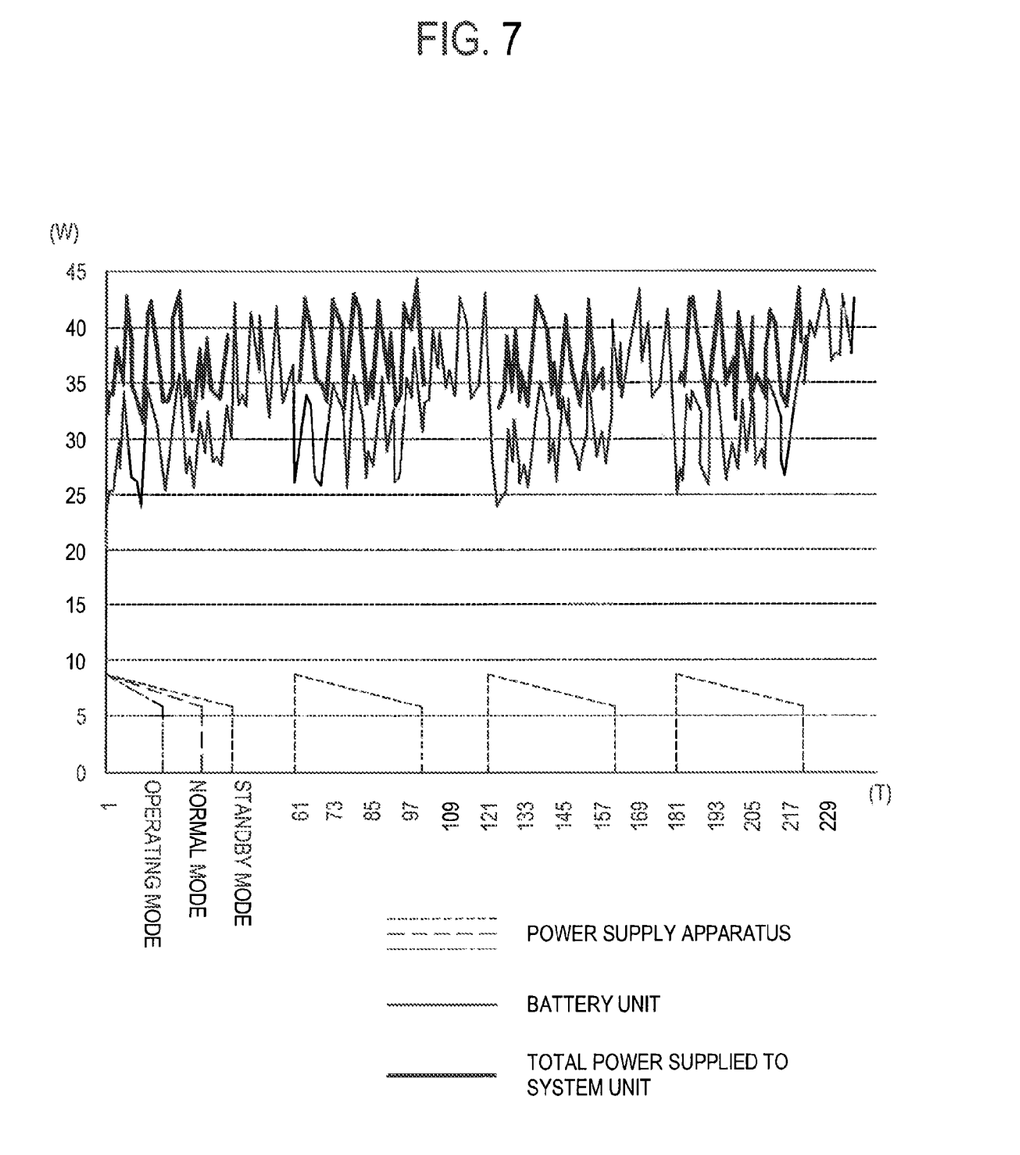
FIG. 7 is a graph showing power supplied from a battery unit and the power supply apparatus to a system unit in the power supply system of FIG. 6.

Referring to FIG. 7, a graph illustrates power supplied from a battery unit 320 and the power supply apparatus 100 to a system unit 310 of the power supply system of FIG. 6.

More specifically, FIG. 7 illustrates a case where the power supplied from the power converter 20 in the power supply apparatus 100 does not satisfy the power necessary to operate the system unit 310 in all of the system modes, i.e., the operating mode, the normal mode and the standby mode. Thus, the system unit 310 receives the necessary power from both the power supply apparatus 100 and the battery unit 320.

The power converted by the power converter 20 of the power supply apparatus 100 is most consumed by the system unit 310 when the system unit 310 is in the operating mode. At this time, an electric current quickly flows from the power converter 20 to the system unit 310, the driving time of the power converter 20 predicted by the [Expression 1] is shorter than those of the normal mode and the standby mode.

During the driving time of the power supply apparatus 100, the power is output to the system unit 310 and the battery unit 30 keeps outputting a predetermined first power level while the power is output from the power supply apparatus 100. The first power level may be a low power level.

However, if the driving time of the power converter 20 is terminated and the power converter 20 suspends operating, there is no output from the power converter 20 to the system unit 310. In this case, the power output from the battery unit 320 is changed to have a second power level necessary to operate the system unit 310. The second power level may be a high power level greater than the low power level.

Thus, the system unit 310 may receive the power having a constant level regardless of the power output of the power supply apparatus 100.

Figure 8:
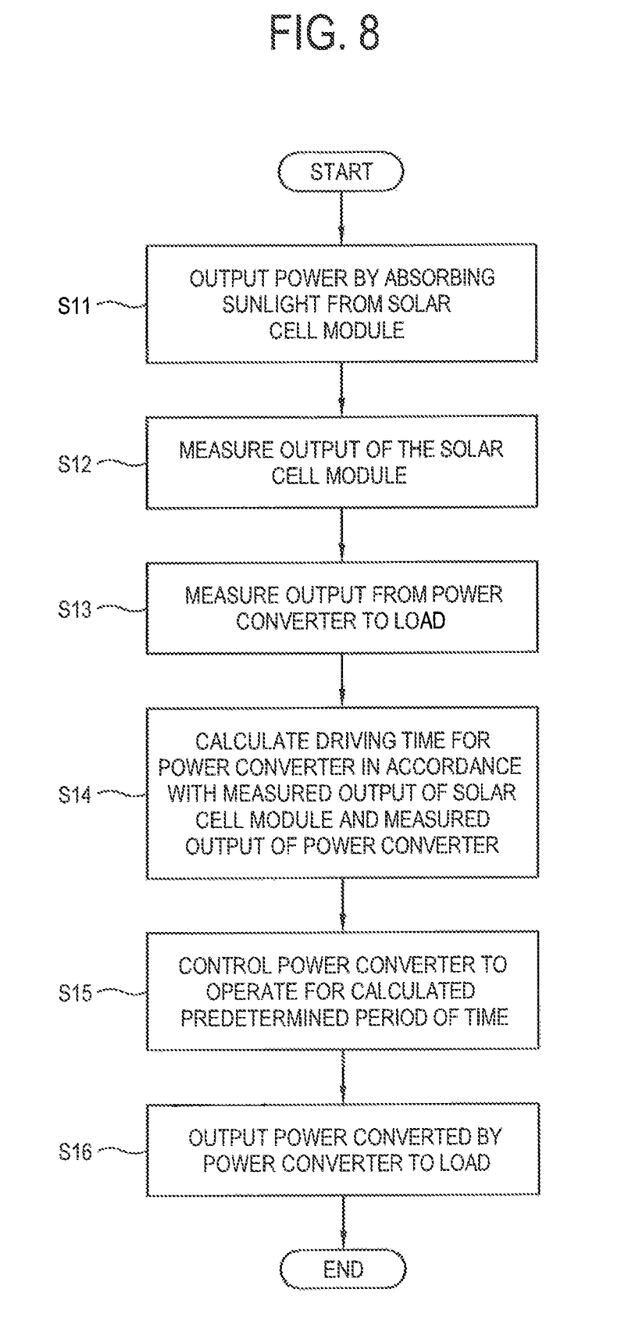
FIG. 8 is a control flowchart of the power supply apparatus according to the first to third exemplary embodiment.

FIG. 8 is a control flowchart of the power supply apparatus according to exemplary embodiments illustrated in FIGS. 2-4.

When a solar cell absorbs sunlight and the solar cell module 10 outputs power (S11), the solar cell module measuring unit 31 measures the output of the solar cell module 10 (S12).

Also, the output from the power converter 20 to the load is measured by the output measuring unit 35 (S13).

The measured output from the solar cell module 10 and the measured output from the power converter 20 are communicated to the driving controller 30, and the driving controller 30 calculates the time over which the power converter 20 having the preset duty ratio is driven in accordance with the difference between the measured output from the solar cell module 10 and the measured output from the power converter 20 (S14).

The driving controller 30 controls the power converter 20 to operate during the calculated driving time (S15), and the power converted by the power converter 20 is output to a load (S16).

Figure 9:
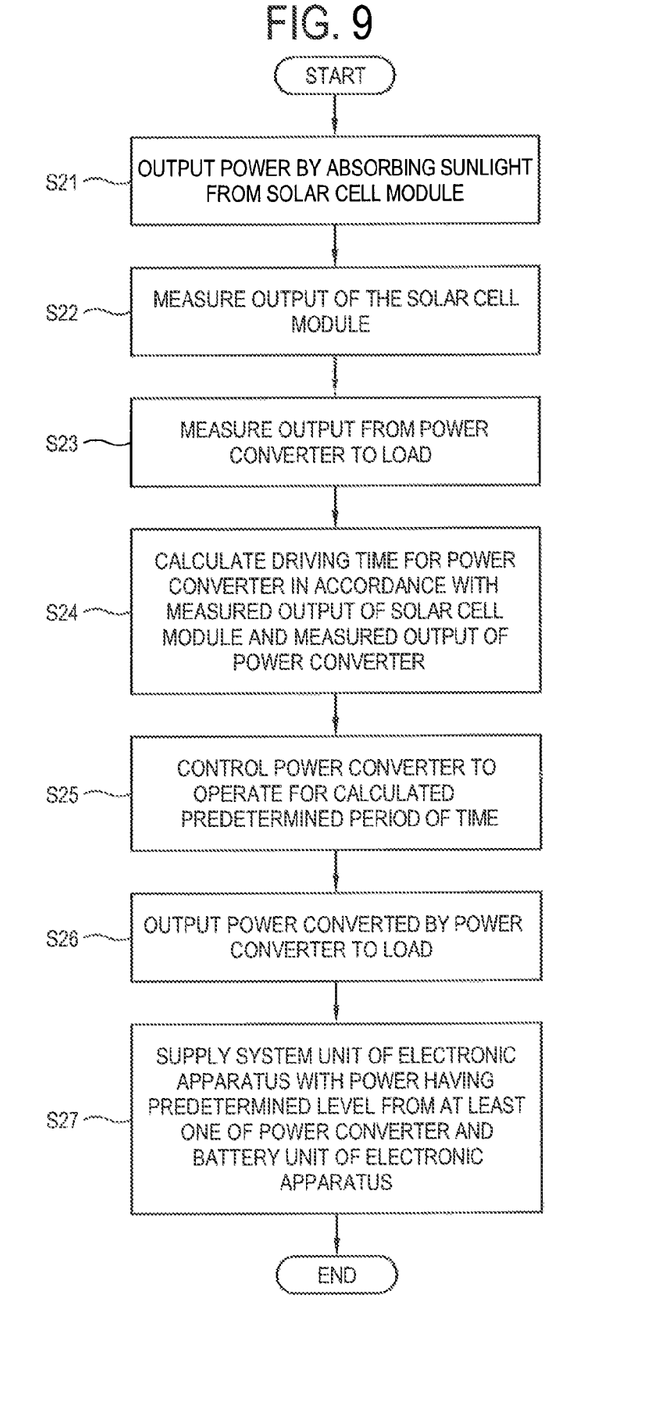
FIG. 9 is a control flowchart of a power supply system according to an exemplary embodiment.

FIG. 9 is a control flowchart of a power supply system according to at least one exemplary embodiment.

When a solar cell absorbs sunlight and the solar cell module 10 outputs power (S21), the solar cell module measuring unit 31 measures the output of the solar cell module 10 (S22).

Also, the output from the power converter 20 to the electronic apparatus 300 is measured by the output measuring unit 35 (S23).

The measured output from the solar cell module 10 and the measured output from the power converter 20 are communicated to the driving controller 30, and the driving controller 30 calculates the time over which the power converter 20 having the preset duty ratio is driven in accordance with the difference between the measured output from the solar cell module 10 and the measured output from the power converter 20 (S24).

The driving controller 30 controls the power converter 20 to operate during the calculated driving time (S25), and the power converted by the power converter 20 is output to a load (S26).

At least one of the power output from the power converter 20 and the power having a predetermined level output from the battery unit 320 of the electronic apparatus 300 is supplied to the system unit 310 of the electronic apparatus 300 (S27). In this case, if a predetermined driving time of the power converter 20 is terminated, the power having a predetermined level from only the battery 320 is supplied to the system unit 310.

As described above, there are provided a power supply, a power supply system and a method of supplying power thereof, in which a power converter to convert output from a solar cell is predicted and controlled by taking variation in the incident energy, load, etc. into account, thereby stably driving the power converter with the minimum electrical stress, avoiding noise due to voltage variation at an input terminal of the power converter, and avoiding additional design of a super-capacitor, a secondary battery, etc. necessary to store energy in order to provide against large variation of the incident solar energy at the input terminal of the conventional converter.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A power supply apparatus comprising:
    a solar cell module including at least one solar cell to absorb sunlight;
    a power converter to convert a power output from the solar cell module and to supply the converted power to a load; and a driving controller configured: to measure the power output from the solar cell module, to determine a driving period of time for which the power converter is driven based on a difference between the measured output of the solar cell module and an output from the power converter, and
    to control the power converter having a preset duty ratio to be driven for the determined driving period of time, wherein: the driving controller, using the preset duty ratio, adjusts the driving period of time to be increased and decreased in response to the difference between the measured output of the solar cell module and the output from the power converter increasing and decreasing, respectively.

2. The power supply apparatus according to claim 1, wherein the driving controller comprises a solar cell module measuring unit to measure the power output from the solar cell module.

3. The power supply apparatus according to claim 2, wherein the driving controller further comprises a driving time calculator to calculate the driving period of time the power converter is driven based on the power output measured by the solar cell module measuring unit.

4. The power supply apparatus according to claim 3, wherein the driving controller further comprises a capacitor to charge in response to the power output from the solar cell module to generate a charged voltage, and
    the driving time calculator calculates the driving period of time the power converter is driven further based on the charged voltage of the capacitor.

5. The power supply apparatus according to claim 4, wherein the driving controller further comprises an output measuring unit to measure the power output from the power converter to the load.

6. The power supply apparatus according to claim 5, wherein the driving time calculator calculates the driving period of time the power converter is driven further based on a difference between the charged voltage of the capacitor and the power output from the power converter to the load measured by the output measuring unit.

7. The power supply apparatus according to claim 1, wherein the driving controller comprises a capacitor to charge in response to the power output from the solar cell module to generate a charged voltage, and
    wherein the driving period of time the power converter is driven is further calculated based on the charged voltage of the capacitor.

8. The power supply apparatus according to claim 2, wherein the driving controller further comprises a driving level calculator to calculate a driving level of the power converter based on the measured power output from the solar cell module, and
    wherein the power converter comprises a driving comparator to compare whether the power converter is driven further based on the calculated driving level.

9. The power supply apparatus according to claim 8, wherein the driving controller further comprises an output measuring unit to measure a power output from the power converter to the load, and
    the driving level calculator calculates the driving level of the power converter based on a difference between the measured power output from the solar cell module and the measured power output from the power converter.

10. The power supply apparatus according to claim 9, wherein the driving controller further comprises a capacitor to charge in response to the power output from the solar cell module, and
    the driving level calculator calculates the driving level of the power converter based on a difference between the charged voltage of the capacitor and the measured power output of the power converter.

11. The power supply apparatus according to claim 1, wherein the power converter comprises a direct current (DC)-direct current (DC) converter.

12. The power supply apparatus according to claim 5, wherein the driving controller further comprises a differential amplifying unit to amplify a difference between the measured power output from the solar cell module and the measured power output of the power converter.

13. A power supplying method of a power supply apparatus, the method comprising: by the power supply apparatus comprising a solar cell module and a power converter, outputting power by absorbing sunlight using the solar cell module;
    converting the power output from the solar cell module to output the converted power using a power converter;
    measuring the power output from the solar cell module;
    determining a driving period of time for which the power converter is driven based on a difference between the measured output of the solar cell module and an output from the power converter; controlling the power converter to operate according to a preset duty ratio for the determined period of time; and supplying the converted power to a load, wherein: the determining the driving period of time further comprises adjusting, using the preset duty ratio, the driving period of time to be increased and decreased in response to the difference between the measured output of the solar cell module and the output from the power converter increasing and decreasing, respectively.

14. The method according to claim 13, further comprising measuring the power output from the power converter to the load.

15. A power supply apparatus including a power converter to output a converted power based on a power from solar cell module including at least one solar cell, the power supply apparatus comprising:
    a driving controller configured: to determine a driving period of time for which the power converter is driven based on a difference between the power from the solar cell module and the converted power from the power converter, and to control operation of the power converter according to a preset duty ratio the determined driving period of time, wherein: the driving controller, using the preset duty ratio, adjusts the driving period of time to be increased and decreased in response to the difference between the power from the solar cell module and the converted power from the power converter increasing and decreasing, respectively.

16. The power supply apparatus of claim 15, wherein the driving controller further comprises an output measuring unit in electrical communication with the power converter, the output measuring unit calculating the converted power and that generates a feedback signal based on the calculated result.

17. The power supply apparatus of claim 16, wherein the driving controller further comprises a driving time calculator that outputs a power converter control signal to control operating time of the power converter.

18. The power supply apparatus of claim 17, wherein the driving controller further comprises a solar cell measuring unit that determines the solar cell output power generated by the solar cell.

19. The power supply apparatus of claim 18, wherein the driving time calculator outputs the power converter control signal based on a difference between the converted power indicated by the feedback signal and the solar cell output power.

20. The power supply apparatus of claim 18, wherein the driving controller further comprises a driving level calculator which outputs the power converter control signal based on a difference between the converted power indicated by the feedback signal and the solar cell output power, and wherein the power converter includes a driving comparator in communication with the driving level calculator to control the power converter based on a comparison between a calculated driving level indicated by the power converter control signal and the converted power from the power converter.

21. The power supply apparatus of claim 20 wherein the driving comparator deactivates the power converter when the calculated driving level is equal to the converted power from the power converter.

22. A power supply apparatus to power a load comprising:
a power converter including a switching device operable in response to a gate pulse having a duty ratio to convert power from a solar cell into a converted power that is supplied to the load; and a driving controller configured: to determine a driving period of time for which the power converter is driven based on a difference between the power from the solar cell module and the converted power from the power converter, to generate the gate pulse, and to control the power converter by calculating the duty ratio of the gate pulse based on the converted power output by the power converter, wherein: the driving controller, using the preset duty ratio, adjusts the driving period of time to be increased and decreased in response to the difference between the power from the solar cell module and the converted power from the power converter increasing and decreasing, respectively.

23. The power supply apparatus of claim 22, wherein the switching device is at least one of a gate turn-off thyristor, an insulated gate bipolar transistor, a power transistor, and a power metal oxide semiconductor field effect transistor (MOSFET).

* * * * *